United States Patent
Kenworthy et al.

[11] Patent Number: 5,950,651
[45] Date of Patent: Sep. 14, 1999

[54] METHOD AND DEVICE FOR TRANSPORTING A MULTI-PHASE FLOW

[75] Inventors: Michael W. Kenworthy, New York; Boris Ganelin, Brooklyn, both of N.Y.

[73] Assignee: Technology Commercialization Corp., New York, N.Y.

[21] Appl. No.: 09/102,512

[22] Filed: Jun. 22, 1998

Related U.S. Application Data

[63] Continuation-in-part of application No. 08/966,662, Nov. 10, 1997, abandoned.

[51] Int. Cl.$^6$ ..................................................... F16L 41/00
[52] U.S. Cl. ..................... 137/13; 137/561 R; 137/561 A
[58] Field of Search ................................. 137/13, 561 R, 137/561 A

[56] References Cited

U.S. PATENT DOCUMENTS

| | | |
|---|---|---|
| 3,899,000 | 8/1975 | Ohiswager et al. ................ 137/561 A |
| 4,135,364 | 1/1979 | Busick . |
| 4,179,332 | 12/1979 | Ilmoniemi . |
| 4,219,424 | 8/1980 | Tamura . |
| 4,284,243 | 8/1981 | Shaner ................................ 137/561 A |
| 4,512,368 | 4/1985 | Kaminaka et al. ................. 137/561 A |
| 4,800,921 | 1/1989 | Greebe . |
| 4,842,690 | 6/1989 | Gazdik . |
| 4,972,804 | 11/1990 | Stolmar . |
| 5,053,061 | 10/1991 | Tatani . |
| 5,156,642 | 10/1992 | Lopez ................................. 137/561 A |
| 5,520,818 | 5/1996 | Smith . |
| 5,529,701 | 6/1996 | Grisham . |
| 5,662,811 | 9/1997 | Grisham . |
| 5,709,731 | 1/1998 | Armstrong . |
| 5,730,220 | 3/1998 | Ganelin . |

FOREIGN PATENT DOCUMENTS 74392 4/1954 Switzerland ....................... 137/561 A

*Primary Examiner*—A. Michael Chambers
*Attorney, Agent, or Firm*—Boris Leschinsky

[57] ABSTRACT

A method and device for transporting of a multi-phase fluid flow in a pipe, wherein the flow is subdivided in a plurality of passages into a number of individual flows so as to reduce the difference in the flow speed between individual phases of a multi-phase fluid.

20 Claims, 6 Drawing Sheets

METHOD AND DEVICE FOR TRANSPORTING A MULTI-PHASE FLOW

This is a continuation-in-part of application Ser. No. 08/966,662 originally entitled "Method and Device for Transporting a Gas-Liquid Flow in Pipes" filed Nov. 10, 1997 now abandoned.

BACKGROUND OF THE INVENTION

1. Field of the Invention

The present invention relates generally to a method of and a device for transporting a multi-phase fluid in conduits and pipes, such as mixtures of natural gas, water, and oil; geothermal and other mixtures of hot liquid and vapor; various pulps and slurries and the like.

2. Description of the Prior Art

It is known to transport multi-phase fluids in conduits or pipes. For the purposes of this specification, the terms "pipe" and "conduit" are used interchangeably. Pipes are known to have a variety of shapes, most commonly a circular shape. However, pipes of non-circular shapes, for example rectangular or square pipes can also be considered. The fluid mixture typically contains two or more individual phases. Each phase may consist of a gas, a liquid, or a number of solid particles. Although the phases do not usually interact with each other chemically, they effect each other hydraulically. The structure of the resultant steady state flow depends on the properties of the individual phases such as the fluid density and viscosity as well as on the flow conditions such as the pressure, temperature, in addition to the shape, orientation, inclination, and size of the conduit.

The phenomenon of a multi-phase flow is observed in many industries. A two-phase flow of a gas and a liquid is recognized in oil-gas pipelines and wells, air-lift pumps, oil refineries, steam boilers, electric power plants, geothermal wells, fluid carrying conduits operating in a zero gravity environment, and other fluid transportation and industrial processing facilities. A two-phase flow of a liquid and solids is known in various pulp and slurry conduits such as in paper processing equipment or transporting of coal, minerals, and the like. Interfacial mass transfer between the phases in a multi-phase flow is also utilized in chemical processing plants and reactors such as gas-fluid contacting reactors, water oxygenation and other liquid gasification devices.

In many cases, the mechanical properties of individual phases, primarily density, are distinctly different. That leads to substantial differences in the flow velocities of each phase. The phase with lower density usually occupies the central part of the conduit and moves faster than the phase with higher density. In a gas-liquid flow conduit, for example in a natural gas/oil well or pipeline, geothermal well, air-lift pump, fluid carrying conduit in zero gravity environment, and the like, the gas phase moves faster than the liquid phase. In addition, due to its less mass and momentum, the gas phase can change speed more rapidly than the liquid phase. This difference in dynamic behavior between the gas and a liquid phase creates unique flow conditions which are different than a single-phase gas or a single-phase liquid flow.

In a vertical or inclined large diameter pipe, as the percentage of gas phase in an upward gas-liquid flow increases, the gas phase speed becomes increasingly higher than the liquid phase speed. In an application where the potential energy of gas phase is used to transport the liquid phase, such as in an oil or geothermal well or in an air-lift pump, the efficiency of liquid delivery may be compromised. An example of such device is described in a U.S. Pat. No. 4,135,364 by Busick. The air-lift pump has a plurality of vertical lift tubes immersed in water and arranged to discharge water into a hood at their upper ends. Compressed air is introduced continuously or periodically into the lower part of each tube to form a bubble which pushes the water up the lift tube. Although capable of pumping water, this device has no provisions that would reduce the tendency of air to slip past the liquid and to collect in the center of the lift tube and flow faster then the water. There is a need, therefore, for a device with improved liquid delivery efficiency due to reduction in slippage between the phases in a multi-phase flow.

Similarly, in a horizontal or inclined large diameter pipe, the existence of a material percentage of a phase with lower density, such as gas, may lead to gas concentrations in a higher portions of the pipe which leaves the heavier density phase collecting at the lower portions of the pipe. As it collects in the lower parts of the piping system, the heavier phase liquid may form blockages and cause additional resistance to the overall flow. U.S. Pat. No. 4,972,804 by Stolmar describes quite an elaborate device to prevent the formation of stagnant volumes and associated with them sludge deposits in a steam generator. Typically, increasing pressure pushes the volumes of the heavier phase liquid out of the lower parts of the pipe thus relieving the pressure buildup. During these cycles of pressure buildups, the spikes in pressure may cause damage to the pipe and require the use of higher powered pumps and pipes with additional structural strength for such applications. Uneven flow may also cause processing difficulties at the receiving end of the pipe system. The need exists therefore for a conduit with continuous constant flow of all phases in a multi-phase flow environment which would prevent the formation of stagnant volumes of the heavier phase.

A turn in a pipe will decrease the speed of the relatively heavier phase of a multi-phase flow due to its higher density and inertia in comparison to the lighter phase. Especially in pipes with little interaction between the phases, this velocity reducing effect occurring in each turn in a pipe may have cumulative effect. As a result, each turn has an effect of changing the downstream flow mixture to the one with higher percentage of the lighter phase. The need exists therefore for a device that would reduce or eliminate this harmful effect.

In a slurry processing facility such as paper pulp plant, it is common to conduct a chemical treatment of a slurry by injecting gas such as chlorine in the mix of liquid and solids. Resultant three-phase flow is carried by conduits to the subsequent stages of processing. Separation and relative changes in individual phase speeds cause production problems not only due to uneven pulp supply but also due to pressure fluctuations. These pressure fluctuations require separate damping devices such as the one described in U.S. Pat. No. 4,179,332 by Ilmoniemi. There is, therefore, a need for a conduit which would ensure consistent flow of all phases as well as prevent pressure build-ups.

In a chemical industry, many chemical and evaporation process operations involve molecular mass transfer between the gas phase and a liquid phase across the gas-liquid interface. It is usually achieved by injection of gas into fluid stream. U.S. Pat. No. 5,666,811 by Grisham describes such an injector device. However, the objective of creating a substantial contact area between the phases is achieved only in vicinity of the injector port. Flow past the injector may separate again into two distinct phases without desirable interfacial contact. The need exist therefore for a conduit which would promote controlled substantial interfacial contact between the phases throughout the interactive or transporting stage in the manufacturing process.

In the electric power generation industry, steam turbines are often used. Usually, to increase the total pressure drop across the system, the steam is condensed at the exit of the turbine to create a low pressure area. In condensing the steam to water, energy of the system is rejected, or wasted, in the form of heat energy of the system plus the energy required to change the phase from steam to water, or the latent heat energy. This rejection of latent heat energy accounts for over 25% of system efficiency losses. The need exists therefore for a device which improves the efficiency of steam turbines by reducing these efficiency losses due to the inability to recover latent heat energy. This situation is also encountered in waste steam recovery operations commonly referred to as cogeneration facilities.

SUMMARY OF THE INVENTION

Accordingly, it is an object of the present invention to overcome these and other drawbacks of the prior art by providing a novel method of and a device for transporting a multi-phase flow in conduits and pipes.

More particularly, it is the object of the present invention to provide a method of and a device which reduces the difference in velocity of a lighter phase relative to the velocity of the heavier phase in a multi-phase flow. In keeping with this and other objects of the instant invention, one feature of the invention resides, briefly speaking, in a method of transporting a multi-phase flow in a pipe, whereas the multi-phase flow is itself subdivided in a transverse direction relative to the direction of the flow, into a plurality of individual multi-phase flows which flow simultaneously, in parallel, and side by side in the direction of the movement.

It is another feature of the instant invention to provide a device for transportation of a multi-phase flow which has a means for confining the multi-phase flow and means for subdividing the multi-phase flow in a transverse direction into a plurality of individual multi-phase flows which flow simultaneously, in parallel, and side by side in the direction of the movement.

When the method is performed and the device is designed in accordance with the instant invention, the ability of a lighter phase to increase its speed relative to the heavier phase in a multi-phase flow is substantially reduced. That, in addition to better interaction between the phases, desirably effects the flow structure, promotes consistent delivery of individual phases, increases interfacial contact, prevents formation of stagnant volumes of the heavier phase in the lower part of the piping system and reduces the energy required to transport the multi-phase fluids.

BRIEF DESCRIPTION OF THE DRAWINGS

A more complete appreciation of the subject matter of the present invention and the various advantages thereof can be realized by reference to the following detailed description in which reference is made to the accompanying drawings in which:

FIGS. 4A and B are transverse views of alternate cross-sections of a device for transporting a multi-phase flow in accordance with the same embodiment of the instant invention;

DETAILED DESCRIPTION OF THE FIRST EMBODIMENT OF THE INVENTION

Figure 1:
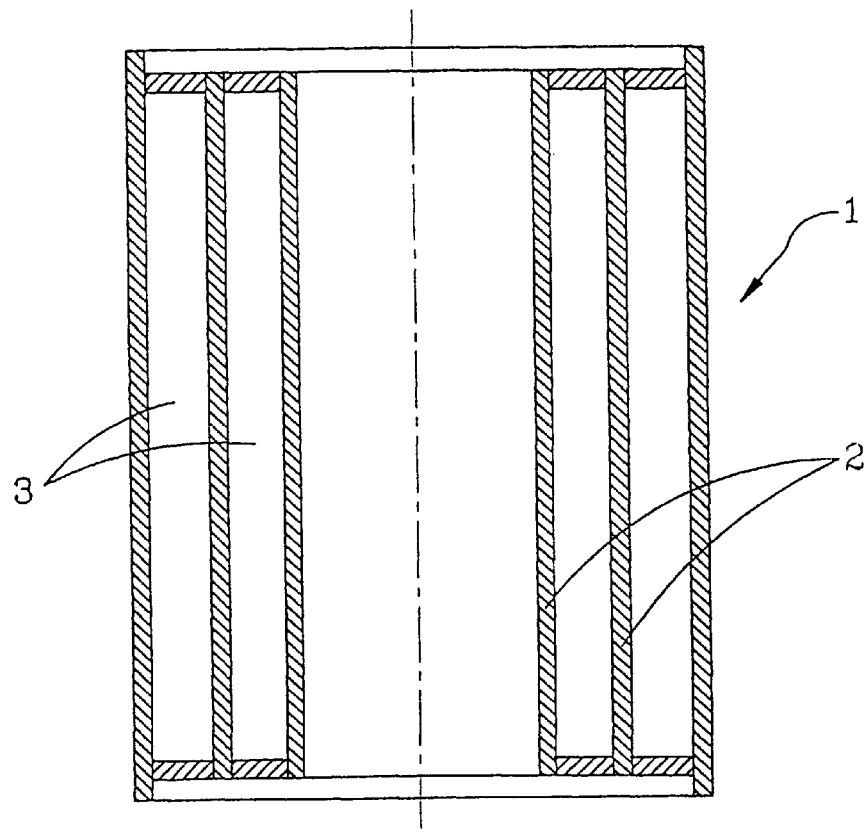
FIGS. 1 and 2 are views showing a transverse and a longitudinal cross-section of a device for transporting a multi-phase flow in accordance with the present invention.

A detailed description of the present invention follows with reference to accompanying drawings in which like elements are indicated by like reference numerals.

Figure 2:
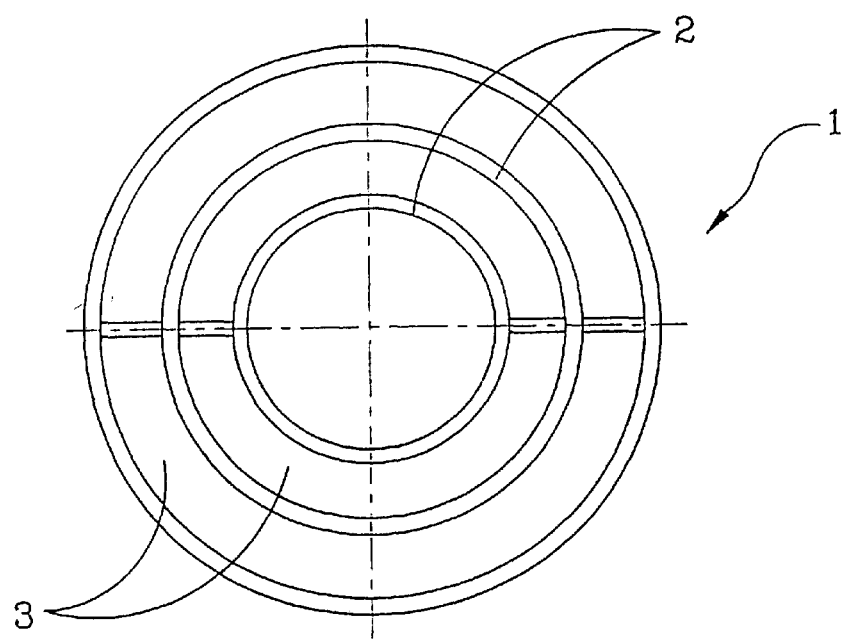

FIGS. 1 and 2 illustrate the first embodiment of the instant invention where in accordance with the method of the invention a conduit or a pipe (1) contains a plurality of subdividing elements (2) for dividing the pipe (1) in a transverse cross-section into a plurality of individual passages (3). In this embodiment, subdividing elements (2) are formed as concentric walls so that the passages (3) are concentric passages. Therefore, a plurality of individual multi-phase flows are carried through concentric passages (3) in the same direction. The size of each individual passage (3) is selected so as to provide a desired flow structure of the individual multi-phase flow.

Considering a gas-liquid two-phase flow as an example, the gas flows faster than the liquid because of its much lower density and viscosity. The relationship between the surfaces of the phases is largely determined by two opposing forces: on the one hand there is the surface tension of the liquid which tends to reduce the boundary area between the phases and, on the other hand, there is the tendency of the compressible lighter gas to find the path of least resistance toward the low pressure area. Typically, the diameter of a gas bubble in a liquid is determined by the surface tension of the liquid and the outside conditions such as pressure, temperature, etc. Gas bubbles naturally tend to coalesce in a static environment. However, in a dynamic flow environment, the ability of the bubbles to coalesce is limited by the flow conditions. In a steady state flow, the tendency of bubbles to slip by the surrounding liquid is influenced by the pipe diameter. The smaller the pipe diameter, the harder it is for an individual bubble to increase its size through coalescence or to increase its speed relative to the speed of the liquid. Ultimately, if the diameter of the pipe becomes less then the prevailing diameter of the bubbles, a periodic two-phase flow structure called "capillary bubble flow" is formed, and the speed of the gas phase will be reduced to the speed of the liquid phase. Thus, subdividing the pipe into smaller individual passages allows to control the extend of speed difference between the phases. In addition, control over the speed of phases reduces the ability of the liquid phase to accumulate and change the volume ratio between the phases.

Similar effect would occur in a multi-phase flow where individual phases have different densities and viscosities.

The bigger the physical difference in density and viscosity between the phases, the bigger is the tendency of the lightest phase to slip by other phases for a given pipe diameter. Reduction in the size of the flow passage reduces the difference in speed between all of the phases.

Same principle may be utilized in a pipe turn in order to maintain a constant flow of all phases. By subdividing the flow into a plurality of individual multi-phase flows, the differences between the flow speeds of individual phases at the exit of the turn can be substantially reduced. That would eliminate pressure fluctuations due to blockage of the turn with stagnant volume of the heavier phase fluid and maintain the proportion of each phase of the flow closer to that of the flow prior to the turn.

In a slurry transporting conduit, the method of the instant invention of subdividing the flow into a plurality of individual flows allows to make the flow speeds of both the lighter and the heavier phase such as water and coal or paper particles for example, substantially equal or regulate their relative speeds as desired. This, in turn, ensures no sediment deposits along the way of the slurry transport or at pipe turns as well as constant and predictable slurry consistency and delivery rate.

In a chemical processing facility, the method of the instant invention can be applied to adjust as desired or to maximize the interfacial contact between the phases thus ensuring consistent outcome of the chemical process or gas-liquid mass transfer operation.

Given the fact that the device according to the present invention works best when the proportion of the various phases inside the conduit before the point of flow subdivision is equal to the proportion of these phases while flowing in each individual passage, in some applications it would be beneficial to place a conventional mixing device prior to the point of flow subdivision in order to achieve an equal distribution of phases across the entire cross-section of the conduit or an enlargement in the conduit to improve entrance flow conditions. Such applications may include the instances of vertical annular flow, as well as most non-vertical situations such as in non-vertical wells, pipelines transporting a slurry, pipeline turns, instances of stratified flow where the heavier liquid tends to collect of the bottom half of the pipe and alike.

DETAILED DESCRIPTION OF THE SECOND, MOST PREFERRED EMBODIMENT OF THE INVENTION

Figure 3:
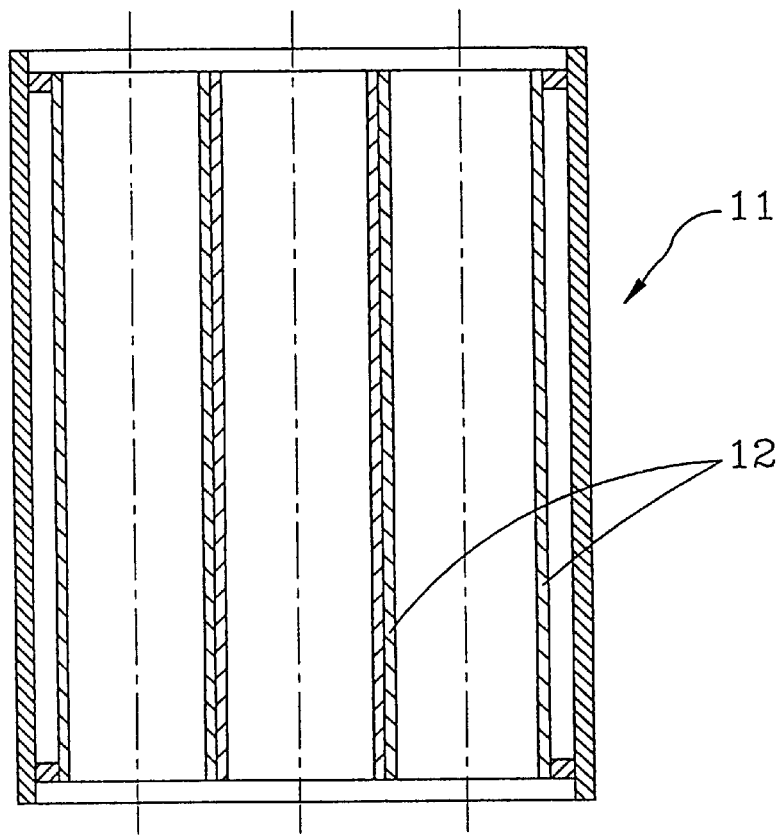
FIGS. 3 and 4 are views showing a transverse and a longitudinal cross-section of a device for transporting a multi-phase flow in accordance with another embodiment of the present invention.
Figure 4:
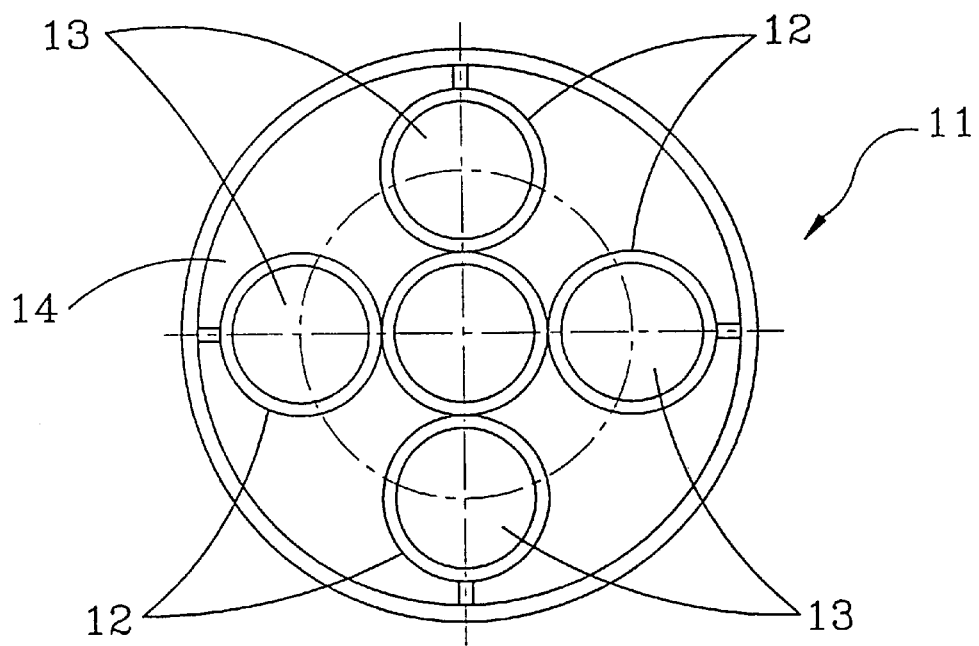
Figure 4:
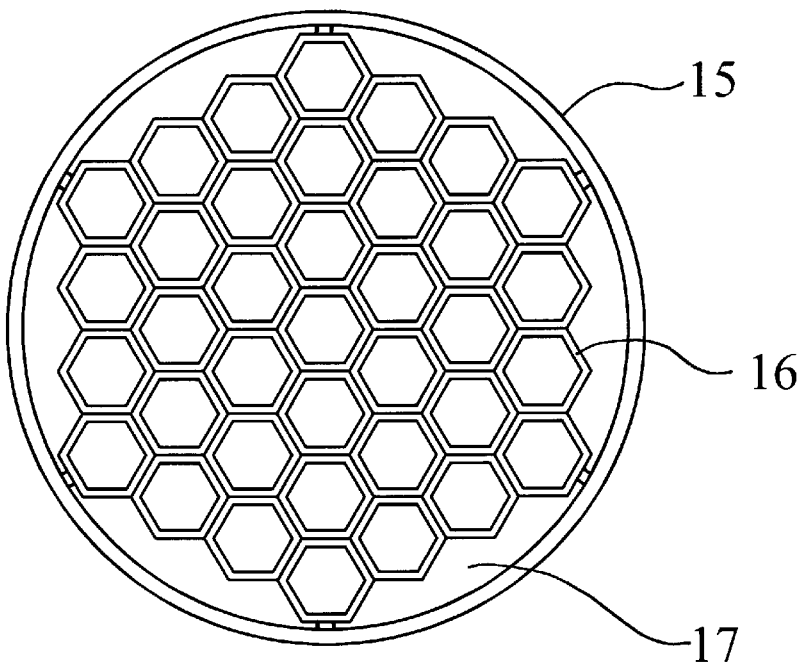
Figure 4:
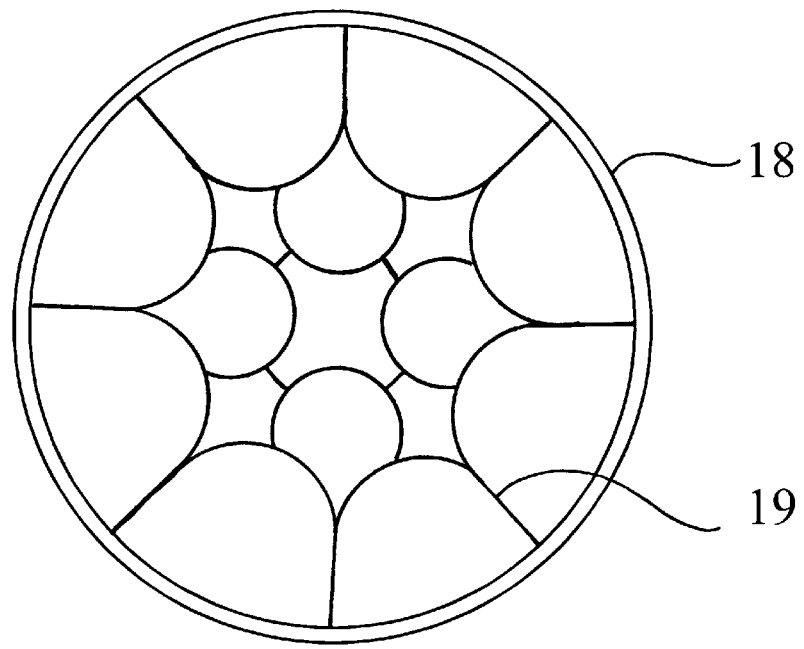
Figure 5:
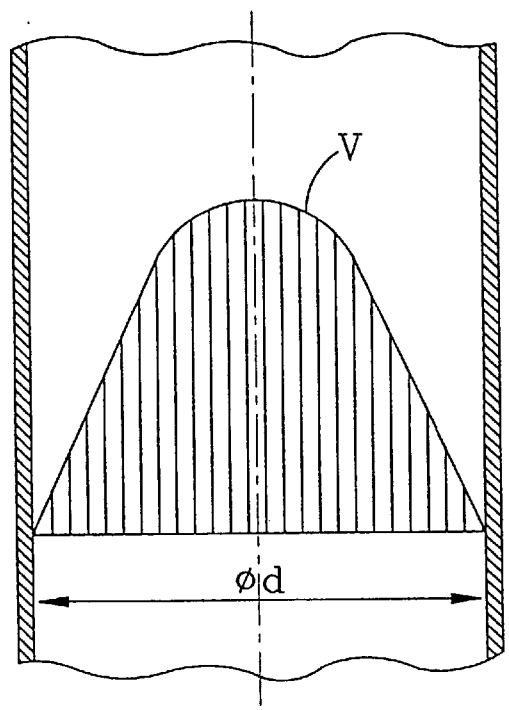
FIGS. 5 and 6 are views showing a change in the flow dynamics of a multi-phase flow in a device in accordance with the prior art and in a device in accordance with the instant invention, where "V" stands for flow velocity and "d" stands for conduit diameter.
Figure 6:
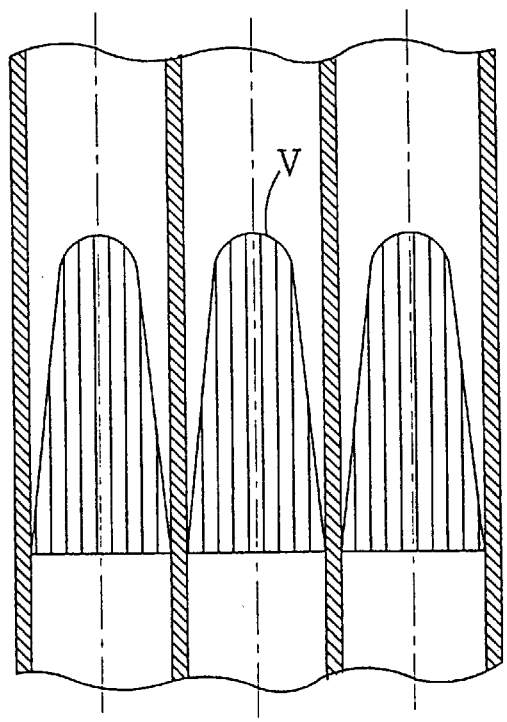

In accordance with the second, most preferred embodiment of the instant invention shown on FIGS. 3 and 4, an interior of the pipe (11) is subdivided by a plurality of walls (12) into a plurality of passages (13) extending side-by-side one another so that the total flow is divided into a plurality of individual multi-phase flows. Also, if desired, the space (14) between the passages (13) can be used for flow as well. However, our experiments with vertical gas-liquid flow have demonstrated that it is beneficial to block spaces (14) off to maintain the best well efficiency in raising fluid.

Alternately, spaces (14) may be utilized for an axillary function other than transporting a multi-phase fluid flow. For example, in an oil or geothermal well, wires can be placed in these spaces for conducting electricity to or to house a variety of devices, including temperature, pressure or other sensors; communication devices, valves, motors, actuators, and alike. In another example in an oil well, gas can be injected through the spaces (14) from the surface down the well as in an artificial gas lift operation. Yet another axillary use is to pump heated fluid down the well in the opposite direction to that of the multi-phase flow in order to prevent paraffin deposits that may restrict or even block the multi-phase flow entirely. Similarly, in a geothermal well liquid can be pumped down using spaces (14).

This second embodiment, with a plurality of circular passages, provides the best shape of the passageway for efficient two phase gas-liquid flow in most applications. With flows having a material proportion of liquid, the shape of the bubbles conforms to that of a small circular passage which has a positive effect of reducing slippage between the phases. In case of annular flow, a circular shaped passage maximizes the transfer of energy from the gas phase occupying the center of the passage to the liquid phase clinging to the passage wall. This embodiment is especially preferred for use in oil wells and pipelines, geothermal wells, pipes for refineries and processing plants, air-lift pumps, fluid carrying conduits operating in a zero gravity environment, and any other multi-phase gas-liquid transporting conduits where the relative speed between the phases or their relative proportions are to be regulated.

Another useful application of this embodiment is in the apparatus designed to convert the energy contained in steam, including the latent heat energy, into potential energy of liquid. In a fashion similar to that of an air-lift pump, steam can be injected into a vertical or inclined conduit containing water and having a plurality of small diameter passages as illustrated in FIG. 4. Due to the great amount of energy required to change phase, the steam will roughly maintain its volume at its condensation temperature for an extended period of time as it rises in the liquid and before it is condensed. In this case, the latent heat of the steam is converted to raising the water height, and this potential energy can be further converted into electricity using a conventional hydro-power generator or used in some other useful way.

Yet another application of this embodiment of the instant invention is in an apparatus designed to compress gas, steam or vapor. With a vertical or inclined column of liquid having a tank at the bottom with conventional gas-liquid separation means, a plurality of small diameter passage tubes are inserted into the column of liquid, and a gas and liquid mixture is forced down the column of liquid, so that pressurized gas is produced at the separation means at the bottom. In one example, the gas can be steam, converting to water toward the bottom of the column. Preferably the diameter of the small passage tubes is small enough to achieve a periodic structure of the two phase flow called capillary bubble flow which allows to reduce the gas slippage to a minimum.

Although circular passages provide optimum fluid flow conditions, the presence of spaces (14) between the passages may be detrimental in applications where the total cross-sectional area of the conduit is limited. In such applications, a non-circular shape of the passage is preferred so as to minimize or even eliminate the spaces between passages. FIG. 4A illustrates one example of such a design where conduit (15) contains a plurality of hexagonal passages (16) and the space (17) between the passages (16) and the conduit (15) is minimized.

Making the shape of the passage irregular allows to eliminate the spaces between the passages entirely. FIG. 4B shows one possible configuration where the conduit (18) contains irregularly shaped passages (19). Other such configurations may be easily conceived of by those skilled in the art such as the space between the passages and the conduit is eliminated to maximize the utilization of the total cross-sectional area of the conduit.

DETAILED DESCRIPTION OF ADDITIONAL EMBODIMENTS OF THE INVENTION

Figure 7:
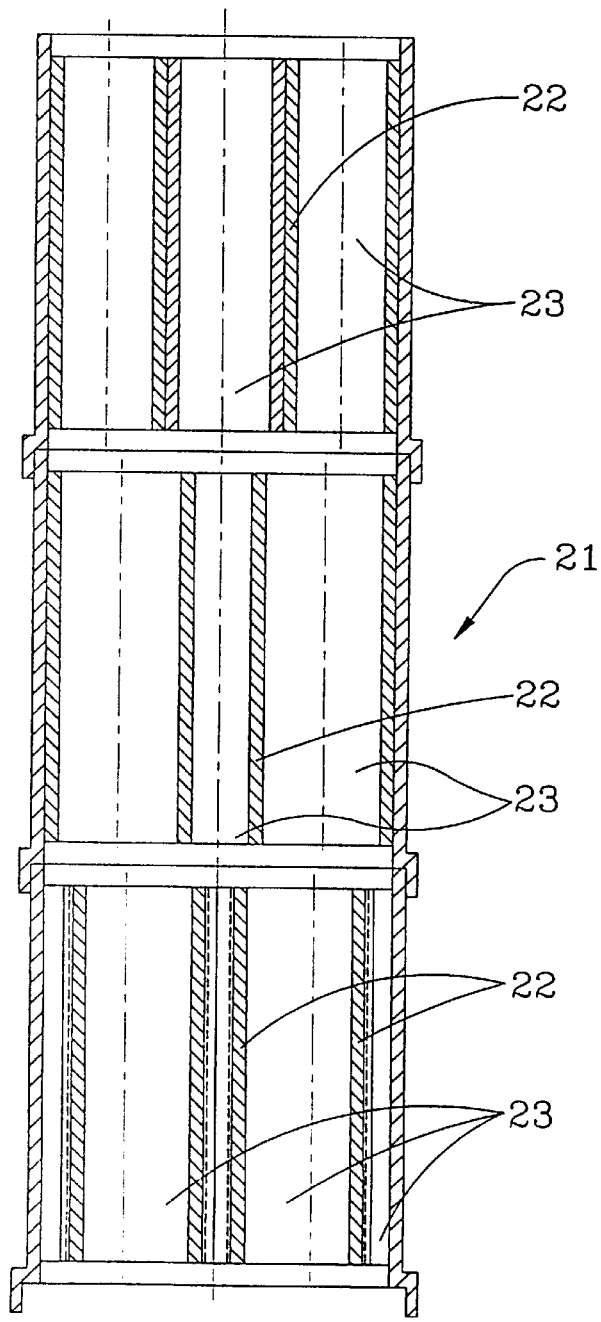
FIGS. 7 and 8 are views showing a longitudinal and a transverse cross-section of a device for transporting a multi-phase flow in accordance with yet another embodiment of the present invention.
Figure 8:
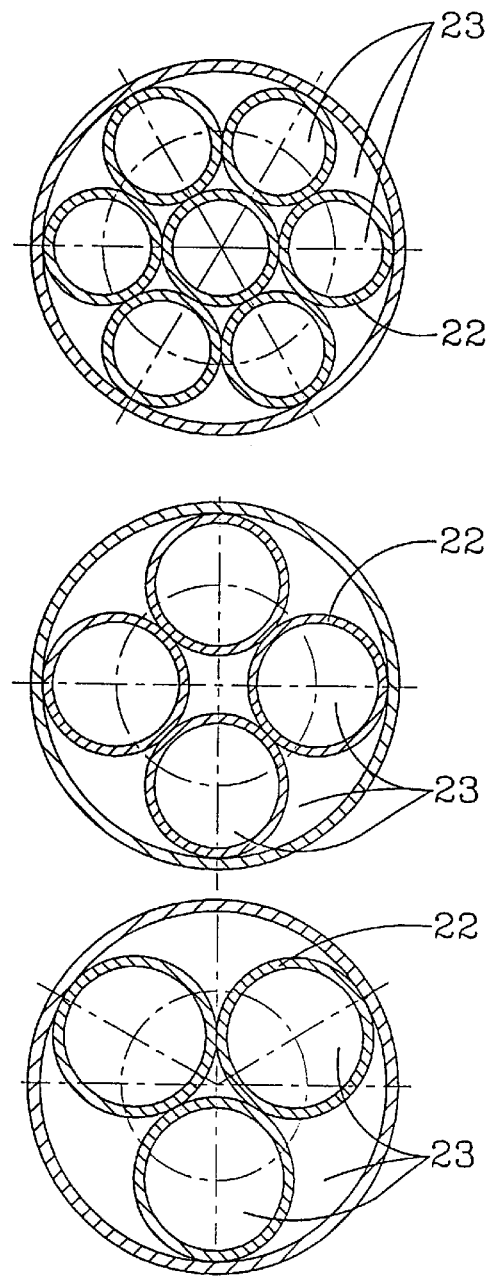

As illustrated in FIGS. 7 and 8 in accordance with yet another embodiment of the present invention, the number and size of individual passages (23) may not be constant but rather can change in accordance with the change in flow conditions. In case of an oil well or geothermal well, this design may be especially beneficial due to increased amount of gas phase in the upper section of the well. Illustrated design would allow to adjust at various well depths the amount of interfacial interaction induced relative to the restrictive effect produced by smaller passage diameters designed to adjust for changing flow conditions such as the proportion of the gas phase. In addition, it will reduce inefficiencies associated with large amounts of gas escaping from the upper portion of the well without delivering much liquid.

Figure 9:
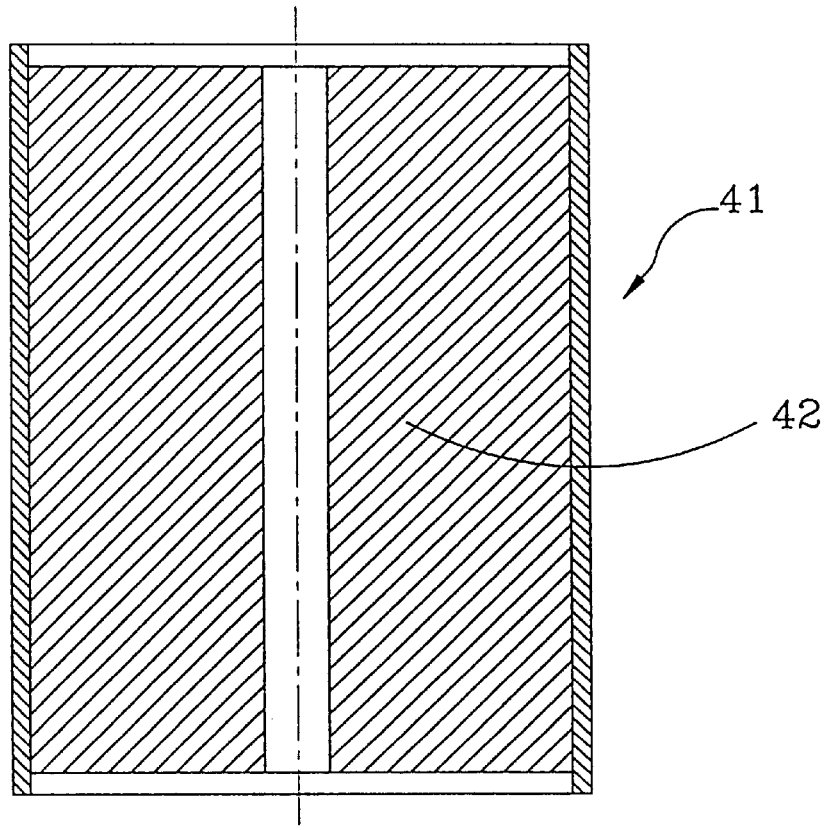
FIGS. 9 and 10 are views showing a longitudinal and a transverse cross-section of a device for transporting a multi-phase flow in accordance with still a further embodiment of the present invention.
Figure 10:
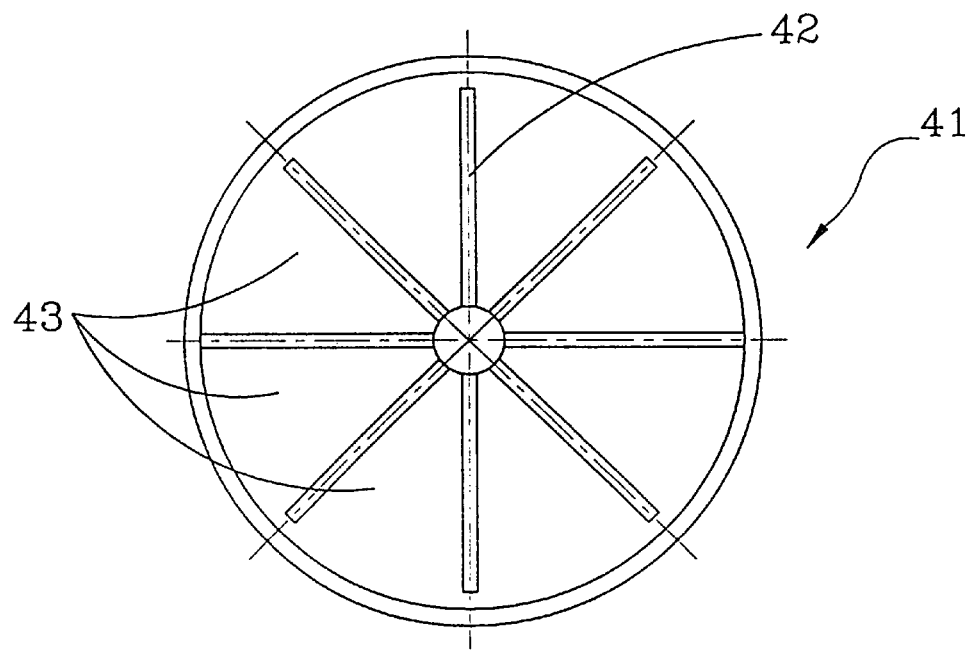

In a still further embodiment of the present invention illustrated on FIGS. 9 and 10, a star-like insert (42) is used to subdivide the flow cross-section in a conduit (41) into a number of individual passages (43) extending side-by-side with one another. This embodiment is particularly useful in applications where heat is being transferred from outside the conduit (41) to the fluid in side the passages (43) such as in boilers or electric power stations, where liquid is converted to vapor and the vapor phase is increasing in proportion up the conduit.

As shown on the drawings, the containing pipe in accordance with the present invention is subdivided into a plurality of individual passages, each formed in accordance with one or several embodiments of the invention and connected in fluid communication with one another (not shown on the drawings) before and, possibly, after the point of flow subdivision.

Given that the device built according to one or several embodiments of the present invention performs best when the proportion of the various phases inside the conduit before the point of flow subdivision is equal to the proportion of these phases in each of individual passages, in some applications it is beneficial to place a conventional mixing device before the point of flow subdivision. This mixing device would allow to mix the flow so as to make equally proportional the phase distribution in each of individual multi-phase flows. Examples of applications where this approach is particularly useful would include the instances of vertical annular flow and most non-vertical multi-phase flows such as in pipelines, slurry transporting conduits, pipeline turns, and other occasions where a stratified flow (in which the heavier liquid phase collects in the bottom half of the pipe) can occur.

Although the present invention has been described with respect to several specific embodiments and applications, it is not limited thereto. Numerous variations and modifications readily will be appreciated by those skilled in the art and are intended to be included within the scope of the present invention, which is recited in the following claims.

What we claim is:

1. A method of transporting a multi-phase fluid in pipes, said multi-phase fluid comprising a first fluid and a second fluid, said method comprising the steps of:

providing a multi-phase fluid containing pipe having an inlet and an outlet so that the multi-phase fluid flows from the inlet to the outlet of the containing pipe;

subdividing the multi-phase fluid flow into a plurality of individual multi-phase fluid flows flowing simultaneously in a direction from the inlet to the outlet of the containing pipe; and combining said plurality of individual multi-phase fluid flows into a final multi-phase fluid flow prior to the outlet of the containing pipe, wherein the difference between the flow speed of the first fluid within the individual flow and the flow speed of the second fluid being substantially reduced.

2. A method as claimed in claim 1, wherein said step of subdividing includes providing in at least a portion of the containing pipe a plurality of individual passages extending in a direction from the inlet to the outlet of the containing pipe, each passage having a cross-section being a fraction of a cross-section of the containing pipe, each passage forming and containing an individual multi-phase fluid flow.

3. A method as claimed in claim 2, wherein said individual passages having an inlet, and said step of subdividing further including providing a mixing means located prior to the inlet of said individual passages in order to equalize proportions of each phase in said multi-phase flow before subdividing into a plurality of multi-phase fluid flows.

4. A method as claimed in claim 2, wherein said individual passages extending concentric with one another and with the containing pipe, so that the individual multi-phase fluid flows flowing concentric with one another.

5. A method as defined in claim 2, wherein said passages extending substantially parallel and side by side with one another.

6. A method as claimed in claim 2, wherein the step of providing of a plurality of individual passages including changing the geometry and size of said passages along the direction of flow from the inlet to the outlet of the containing pipe.

7. A method as claimed in claim 2, wherein the step of providing of a plurality of individual passages including changing the number of said passages along the direction of flow from the inlet to the outlet of the containing pipe.

8. A device for transporting a multi-phase fluid, said multi-phase fluid comprising a first fluid and a second fluid, said device comprising:

a multi-phase fluid containing pipe having an inlet and an outlet so that the multi-phase fluid flows from the inlet to the outlet of the containing pipe;

means for subdividing the multi-phase fluid flow into a plurality of individual multi-phase fluid flows flowing simultaneously in a direction from the inlet to the outlet of the containing pipe; and means for combining said plurality of individual multi-phase fluid flows into a final multi-phase fluid flow prior to the outlet of the containing pipe, wherein the difference between the flow speed of the first fluid within the individual flow and the flow speed of the second fluid being substantially reduced.

9. A device as claimed in claim 8, wherein said means for subdividing containing at least in a portion of the containing pipe of a plurality of individual passages extending in a direction from the inlet to the outlet of the containing pipe, each passage having a cross-section being a fraction of a cross-section of the containing pipe, each passage forming and containing an individual multi-phase fluid flow.

10. A device as claimed in claim 9, wherein said individual passages extending concentric with one another.

11. A device as claimed in claim 9, wherein said individual passages extending substantially parallel with one another.

12. A device as claimed in claim 11, wherein said passages being circular.

13. A device as claimed in claim 12, wherein the space between said passages being utilized for an axillary purpose other than transporting a multi-phase fluid flow.

14. A device as claimed in claim 11, where said passages being non-circular and the space between said passages being minimized.

15. A device as claimed in claim 14, wherein said passages being hexagonal.

16. A device as claimed in claim 14, wherein said passages being of irregular shape and having no space between each other and said pipe.

17. A device as claimed in claim 14, wherein said passages being formed by a star-like insert.

18. A device as claimed in claim 9, wherein said passages having an inlet, said device containing a mixing means positioned before the inlet of said passages so as to equalize proportions of each phase of the multi-phase fluid prior to subdividing the flow into a plurality of individual multi-phase fluid flows.

19. A device as claimed in claim 9, wherein said individual passages having their geometry changing, along the direction of flow from the inlet to the outlet of the containing pipe.

20. A device as claimed in claim 9, wherein a number of said individual passages changing along the direction of flow from the inlet to the outlet of the containing pipe.

* * * * *